April 26, 1949.  A. G. RICHARDSON ET AL  2,468,110
CATHODE-RAY INDICATOR
Filed Dec. 7, 1945
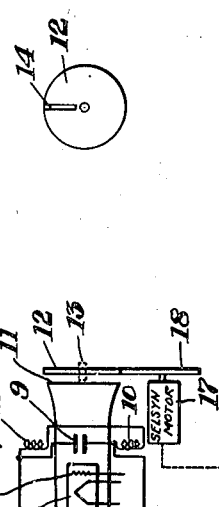
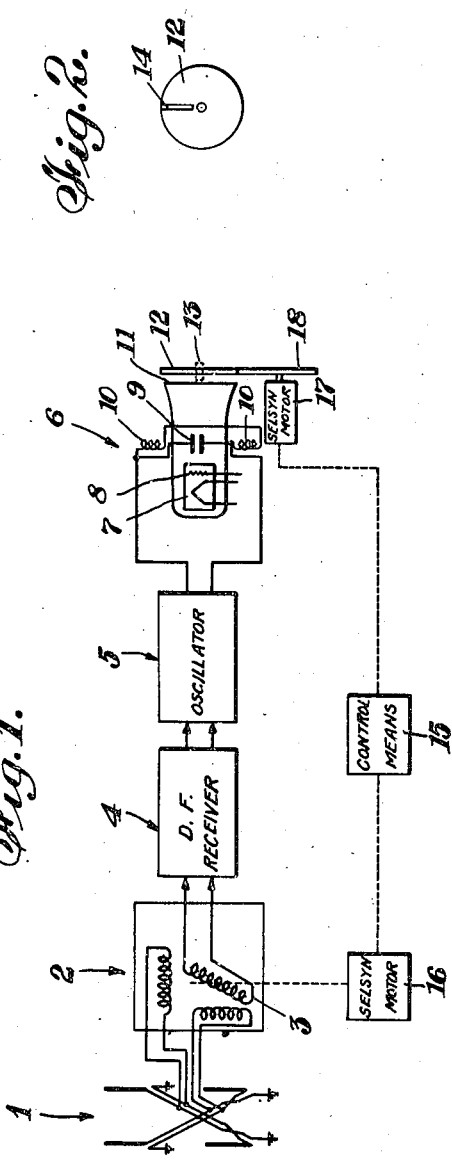
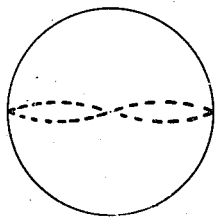
INVENTOR.
AVERY G. RICHARDSON
BY
RPMorris
ATTORNEY Patented Apr. 26, 1949

2,468,110

UNITED STATES PATENT OFFICE 2,468,110

CATHODE-RAY INDICATOR

Avery G. Richardson, Boonton, N. J., assignor to Federal Telephone and Radio Corporation, New York, N. Y., a corporation of Delaware Application December 7, 1945, Serial No. 633,463

7 Claims. (Cl. 343—118)

This invention relates to indicators of the type employing cathode ray tubes, and particularly indicators for use in direction finders.

In certain types of cathode ray tube indicators for direction finding systems, the spot is caused to rotate to produce a circle on the screen of a cathode ray oscillograph tube. In such systems, it has been customary to use two-phase sinusoidal energy applied to the horizontal and vertical deflecting plates of the tube respectively to thereby produce a circular sweep. To produce an indication, both phases have been modulated to cause the spot to move inwardly toward the center of the screen. In such systems, it has been found that a great deal of difficulty is encountered in attempting to balance the modulation of the two-phase energy, thus a considerable amount of distortion is introduced in the indications.

An object of the present invention is the provision of an improved cathode ray oscillograph type indicator which produces improved indications.

Another object is the provision of an improved indicator of the type hereinabove mentioned in which the spot is rotated.

Another object of the present invention is the provision of an improved direction finder which gives improved directional indications.

Other and further objects of the present invention will become apparent and the invention will be best understood from the following description of an embodiment thereof, reference being had to the drawings, in which:

Fig. 1 is a schematic diagram of a direction finding system embodying my invention;

Fig. 2 is a plan view of a disk employed in the system of Fig. 1; and

Figs. 3 and 4 are representations of the appearance of a slow and fast trace as it would be shown in the system of Fig. 1 in response to incoming signals.

Referring now to Fig. 1, the direction finder there illustrated may include an Adcock array, generally designated by the numeral 1, and providing a directional pattern. The array 1 is connected to the stator coils of a goniometer 2, whose rotor coil 3 is in turn connected to a direction finding receiver 4, the rotation of said coil being, in effect, a rotation of the radiation pattern of the array 1. The output of the direction finding receiver 4 may be employed to modulate the output of an oscillator 5, the oscillator 5 having a relatively high frequency output compared to the frequency of rotation of the coil 3. The output of oscillator 5 is in turn applied to a cathode ray oscillograph tube 6, having the usual beam-producing means in the form of an electron gun 7, whose grid 8 is normally biased so as to be conductive during operation.

The deflection system employed includes a set of deflection plates 9, adapted to produce deflection along one axis and a set of fixed coils 10, adapted to produce deflection along another axis at right angles to the first axis. Coils 10, and deflection plates 9, form a tuned circuit, the deflection plates 9 being, in effect, a condenser. This tuned circuit is tuned to the frequency of the output of oscillator 5. The voltages across the deflection plates 9 and the current through coils 10 will be substantially 90° out of phase. Thus a rotational field will be produced which will rotate the beam and produce a circular trace on the screen 11 of the cathode ray tube 6. A circular mask or shield 12 is arranged in front of the screen 11 and is pivoted for rotation on a pivot 13, at the center of the screen and at the center of the circular trace produced on said screen. The mask 12 has a radial slit 14, through which the screen is visible. The mask 12 is rotated at the same speed as goniometer coil 3. For this purpose, a single control means 15 may be used to control two Selsyn or synchromotors 16 and 17 respectively, motor 16 driving the goniometer coil 3 and motor 17 driving a disk 18 which may be in frictional engagement with the circular mask 12. Disk 18 and mask 12 may be of the same diameter so that the driving ratio is one-to-one and the mask 12 will thus rotate at the same speed as the goniometer coil 3.

In operation, a circle is produced on the screen 11 which may be for example, at a frequency of about 100 kilocycles or 250 kilocycles. The oscillator is modulated by the output of the receiver so the circle diameter decreases as a signal is applied to the receiver. The spot is rotated at a very much higher rate of speed than the goniometer coil 3. Whenever a signal is applied to the receiver, the diameter of the circle will appear to decrease as if the whole circle was collapsing at once; although, actually, the spot is moving in a tight spiral. The rotation of the mask in front of the screen makes small portions of this collapsing circle visible so that a pattern is produced.

If the radial modulation of the circle is slow, the successive lines of the spiral are so close together that they produce a solid line when viewed through the slot in the disk. For high speed modulation, the worst condition is probably the one in which the output of the receiver approaches a square wave. The spot would then travel in a spiral which was steep enough so there would be an appreciable space between the successive lines. In such a case, a dotted trace would be produced.

Assuming the real bearing to be so sharp that it produces an ideal pattern 2° wide on the screen, the spot would travel from the outside of the screen to the center in about 1° of disk rotation. If one complete rotation of the disk occurred in 1/30 second, the time of the above motion is $1/30 \times 1/360 = 1/10800$ second.

With the oscillator 5 operating at 100 kilocycles, the spot would travel from the outside to the center during 10 cycles and there would therefore be produced on the screen, a spiral of 10 turns from outside to inside. If the frequency of oscillator 5 were 250 kilocycles, the spiral would have 25 turns and the trace would then appear to have 25 dots outlining the shape of the pattern. Since on a 5" screen the dots would be something closer than 1/5 of an inch to each other, a good trace would be produced.

Figs. 3 and 4 show respectively the effects of a slow trace and a fast trace, with Fig. 4 representing a condition in which the output of the receiver approaches a square wave and Fig. 3 representing a condition in which the output was somewhat less sharp. It will be noticed that the dots in Fig. 4 are more widely apart than those in Fig. 3.

While I have described above the principles of my invention in connection with specific apparatus, it is to be clearly understood that this description is made only by way of example and not as a limitation on the scope of my invention as defined in the accompanying claims.

I claim:

1. An electronic indicator comprising a cathode ray tube having a screen, means for producing an electron beam directed toward said screen, and means for rotating said beam at a high rate of speed; and a rotatable mask mounted in front of said screen hiding the surface thereof, said mask having a radial slot therein through which the screen is visible, and means for rotating said mask at a relatively low rate of speed.

2. A direction finder comprising means for rotating a directive pattern at a predetermined rate, an oscilloscope indicator, a receiver, means for producing a circular trace on the screen of said indicator at a high rate with respect to said predetermined rate, means for radially displacing said trace on said screen under control of energy received on said directive pattern, a linear indicating mask mounted in front of said screen, and means for rotating said mask in synchronism with rotation of said pattern.

3. A direction finder comprising means for producing a rotary directive received signal pattern at a given rate, an oscilloscope indicator, means for scanning the screen of said indicator at a rate substantially higher than said given rate to produce illumination thereon having a radial displacement corresponding in amplitude to the received signal level, and slotted masking means movable over said screen in synchronism with said rotary directive pattern, to provide an effective visible tracing of a received signal pattern.

4. A direction finder comprising radiant-acting means producing a directional pattern; means for producing an effective rotation of said pattern at a given rate; a direction finding receiver coupled to said radiant-acting means; a cathode ray oscillograph tube having a screen, means for producing an electron beam directed toward said screen, and means for rotating said beam for producing a circular trace on said screen having a rotational rate relatively high compared to said given rate; means coupling said receiver to said tube for substantially producing a variation in diameter of the circular trace in response to an incoming signal; a mask arranged in front of said screen and having an aperture therein; means for cyclically moving said mask relatively to said screen to move said aperture into different points in front of said screen; and means for synchronizing the cyclical rate of movement of said mask with the rotation of the radiant-action pattern.

5. A direction finder comprising radiant-acting means producing a directional pattern; means for producing an effective rotation of said pattern at a given rate; a direction finding receiver coupled to said radiant-acting means; a cathode ray oscillograph tube having a screen, means for producing an electron beam directed toward said screen to cause illumination thereof, and means for rotating said beam for producing a circular trace on said screen having a rotational rate relatively high compared to said given rate; means coupling said receiver to said tube for substantially producing a variation in diameter of the circular trace in response to an incoming signal; a rotatable mask mounted in front of said screen covering the face thereof, said mask having a radial slot therein through which the screen is visible; means for rotating said mask; and means for synchronizing the rotation of said mask with the rotation of the radiant-action pattern.

6. A direction finder according to claim 5 wherein said mask is mounted for rotation on a pivot aligned substantially with the center of the circular trace.

7. A direction finder comprising an Adcock array; a goniometer coupled to the output of said array; a direction finding receiver coupled to the output of said goniometer; means for rotating said goniometer at a given rate; a cathode ray oscillograph tube having a screen, means for producing an electron beam directed toward said screen, and means for rotating said beam at a relatively high rate of speed to produce a circular trace on said screen; means coupling said receiver to said tube for substantially producing a variation in diameter of the circular trace in response to an incoming signal; a mask arranged in front of said screen and having an aperture therein; means for cyclically moving said mask relative to said screen to move said aperture into different positions in front of said screen; and means for synchronizing the cyclical rate of movement of said mask with the rotation of said goniometer.

AVERY G. RICHARDSON.

REFERENCES CITED

The following references are of record in the file of this patent:

UNITED STATES PATENTS

| Number | Name | Date |
|---|---|---|
| 2,208,209 | Busignies | July 16, 1940 |
| 2,407,281 | Johnson et al. | Sept. 10, 1946 |
| 2,408,039 | Busignies | Sept. 24, 1946 |